E. W. SKINNER.
Harvester.
No. 223,014.      Patented Dec. 30, 1879.
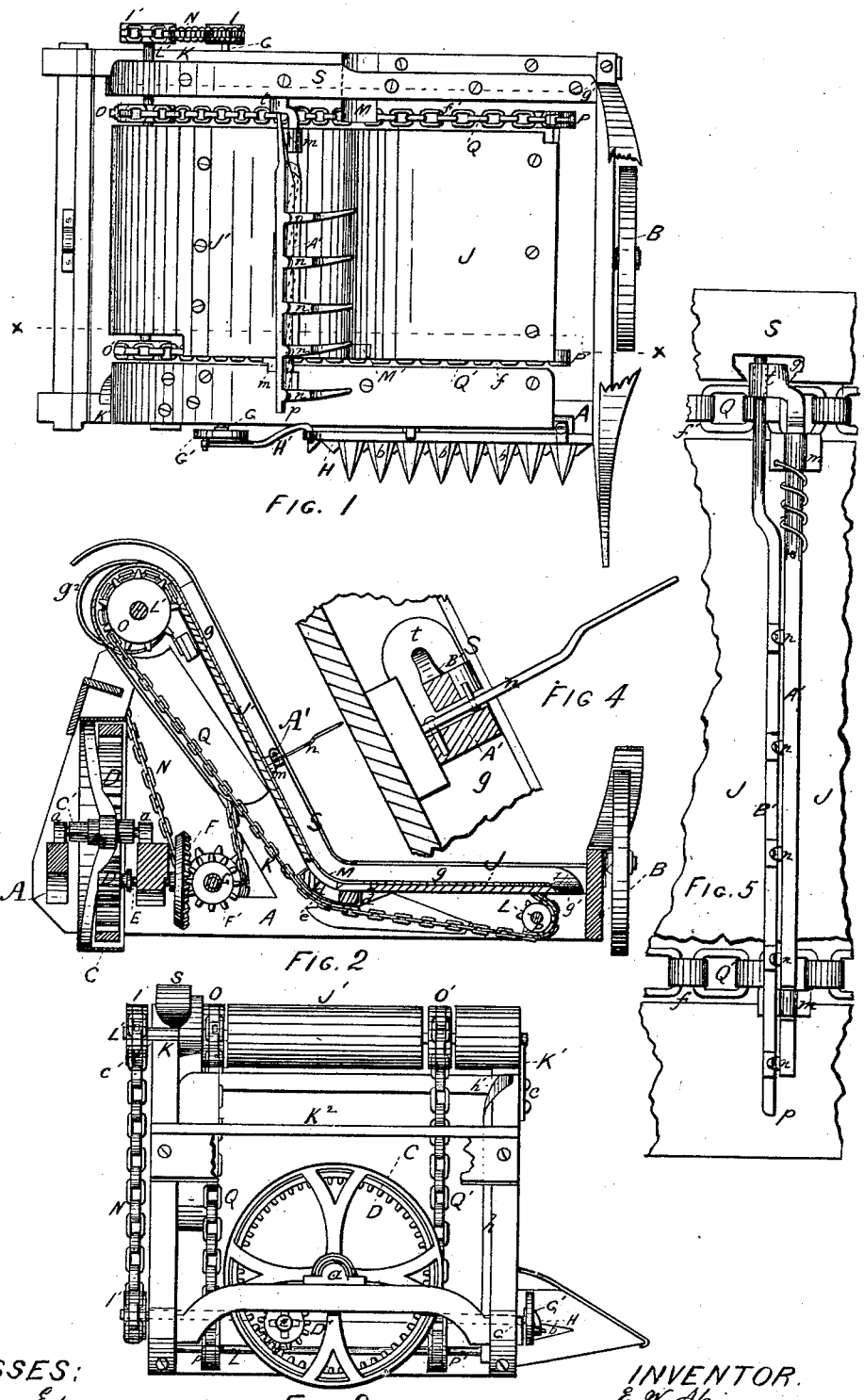

UNITED STATES PATENT OFFICE.

ELISHA W. SKINNER, OF SIOUX CITY, IOWA.

IMPROVEMENT IN HARVESTERS.

Specification forming part of Letters Patent No. 223,014, dated December 30, 1879; application filed April 5, 1878.

*To all whom it may concern:*

Be it known that I, ELISHA W. SKINNER, of Sioux City, in the county of Woodbury and State of Iowa, have invented certain new and useful Improvements in Harvesters; and I do hereby declare the following to be a full, clear, and exact description thereof, which will enable others skilled in the art to which my invention appertains to make and use the same, reference being had to the accompanying drawings, forming part of this specification, in which—

Figure 1 represents a general plan or top view of a harvesting-machine embodying my said invention. Fig. 2 represents a vertical transverse section of the same on the line $x\ x$ drawn across Fig. 1. Fig. 3 represents a side elevation. Fig. 4 represents an enlarged cross-section of the rake, and Fig. 5 represents an enlarged detail plan of the same.

Like letters of reference indicate like parts.

My invention has reference to rakes used in collecting grain from the platform of a harvester and delivering it in gavels, more particularly in that class of harvesting-machines having an elevated side delivery, from which the cut grain is discharged in gavels upon a binder's table or into a suitable binding apparatus; and the invention consists in the mode of arranging and operating the rake in relation to the harvester-platform or platform and elevator; in the peculiar construction of the rake; in the means employed for operating it; and in the various combinations hereinafter described and claimed.

In the drawings, A represents the frame-work of the platform, which may be arranged as shown, or in any other suitable form that will receive the operating parts of the machine. B represents the grain-wheel, which is located at the edge of the platform, so as to support the same in the usual manner. C represents the main driving-wheel, which is mounted upon a transverse shaft, C', having its bearings in boxes $a\ a$ attached to the frame A. This wheel is provided with an internal gear, D, which engages with a gear-pinion, D', on a transverse shaft, E, said shaft having its bearings in suitable boxes attached to the frame.

F is a bevel-gear wheel mounted upon the shaft E, and adjusted to engage with a corresponding gear-pinion, F', on a longitudinal shaft, G, said shaft extending the entire length of the machine, and having its bearings in boxes secured to the transverse members of the frame A. These parts are so arranged as to impart a rotary motion to the said shaft G by the rotation of the main driving-wheel as the machine is moved forward. G' is the crank-wheel, which is mounted upon the forward end of the shaft G, and so as to revolve with said shaft.

H is the sickle, which is arranged within the guards $b'$ in the usual manner. H' is the pitman, which is connected at one end to the sickle and at the opposite end to the wrist-pin of the wheel G', as shown in Fig. 1, so as to impart a reciprocating movement to the sickle by the rotation of said wheel.

J is the platform proper, upon which the cut grain falls.

K and K' are uprights, which are attached to the transverse members of the frame A at a point near the edge of the platform opposite to the grain-wheel B, and incline outward at their upper ends from the platform, as shown in Fig. 2.

L is a shaft, which is supported at its ends in suitable boxes attached to the transverse members of the frame at a point near the outer edge of the platform, and is so arranged as to freely revolve. L' is a like shaft, which is journaled in boxes $c\ c$, adjustably attached to the upper ends of the uprights K and K', respectively.

J' is the grain board or elevator, which is or may be formed as a part of the platform J, and which extends upward between the uprights K K', and in the same plane with the front edge of the said uprights, as shown in Fig. 2. The frame-work and gearing thus far described are common in harvesters, and may be departed from without varying the principle of my invention.

Attached to the frame-work of the machine immediately under the platform are longitudinal bars $d\ d$, extending the entire width of the platform and between the transverse members of the frame; and attached to the lower surface of the said bars, and at each end thereof, is an arc-shaped metal plate, $e$, as shown in Fig. 2.

M is an arc-shaped shoe, which is secured to the frame A so as to be in the same plane with the upper surface of the platform and grain-board J' at their junction; and M' is a like shoe, which is secured to the platform at its junction with the grain-board, as shown in Fig. 1.

I is a rag-wheel, which is mounted on the end of the shaft G opposite to the crank-wheel; and I' is a like rag-wheel, which is mounted upon the end of the shaft L'.

N is a chain-belt, which passes around the wheels I and I', by which means a rotary motion is imparted to the shaft L' by the rotation of the shaft G.

O O' are rag-wheels, which are mounted upon the shaft L' between the uprights K and K'; and P P' are like rag-wheels, which are mounted upon the shaft L between the transverse members of the frame A, as shown in Figs. 1 and 3.

Q Q' are chain-belts, which pass around the wheels O O' on the shaft L', and from thence downward back of the grain-board J' and under the platform J to and around the wheels P P' on the shaft L, as shown in Fig. 2. The upper portion of the chains Q Q' passes under and against the shoes M M', respectively, and the lower portion of the chains passes under and against the plates $e$ $e$ on the bars $d$ $d$, the object of which is to cause the upper portion of the chains to travel in a line parallel with the upper surface of the platform and grain-board.

The platform and conveyer-apron are provided with a slot or channel, $f$, formed through them in a plane immediately over the chain Q', and parallel therewith, and are so arranged as to leave an open space or channel, $f'$, between their rear edge and the back member of the frame A and upright K, immediately over the chain Q and parallel therewith, as shown in Fig. 1.

Secured to the upper surface of the rear member of the frame A and to the front edge of the upright K' is a metal guide-plate, S, which is provided with, or so arranged as to form, a groove, $g$, immediately above the member of the said frame and in front of the upright, and extending in planes parallel with the platform and grain-board, as shown in Fig. 2.

The vertical wall of the groove $g$ is beveled off at its end adjacent to the grain-wheel, so as to form a cam, $g'$, as shown by dotted lines, Fig. 1.

Attached to the rear side of the upright K' is a track, $h$, which is arranged in a plane parallel with the back of the grain-board. The upper end of this track is also beveled off, so as to form a cam, $h'$, as shown in Fig. 3.

Attached to the chains Q and Q' are journal-boxes $m$ $m$, mounted upon an extended portion of one of the links, which extend upward through the channels $f$ and $f'$ in the platform, and is bent or so formed as to make up the lower half of the boxes $m$, which thus rest against the upper surface of the platform and grain-board as the chains are moved forward.

A' represents the rake-head proper, which is journaled within the boxes $m$ $m$ so as to admit of a slight yielding or rocking movement, and is so arranged as to pass over the platform and grain-board and in close proximity thereto as the chains are moved forward. The rear end of the rake-head is provided with an arm, $t$, extending at right angles therefrom and backward into the groove $g$, by which means the rake-head is held in the proper upright position when passing over the platform and grain-board.

$n$ $n$ represent the rake-teeth, which are pivoted to the rake-head at regular intervals, and so as to project therefrom, as shown in Fig. 4, when in a working position, and so as to fold against the rake-head and longitudinally therewith, as shown by dotted lines, Fig. 1, when passing under the grain-board and platform.

B' represents an adjusting-bar, to which are pivoted the several rake-teeth at a point slightly above the pivot connecting the tooth to the rake-head, as shown in Fig. 4, and is so arranged as to admit of a longitudinal reciprocating movement. One end of this bar passes through the arm $t$ of the rake-head and against the vertical wall of the groove $g$, and the other end of the bar projects beyond the end of the rake-head, as shown at $p$, Fig. 5.

A spring coiled about the bar, and having one bearing upon the bar and the other upon the rake-head or crank-arm, may be used to secure elasticity in its reciprocations.

The track $g$ is extended eccentrically at $g^2$ relatively to and beyond the upper curve of the grain-board, to sustain the crank-arm $t$ at the extremity of the rake and keep the latter from throwing the grain too violently in delivering it upon the binding-platform.

The horizontal bar $K^2$ is connected to the uprights of the frame and located over the main driving-wheel C and in the track of the rake, to keep the latter from striking said wheel and retain the rake-teeth horizontally until the head of the rake has passed the bar and the whole of the grain has been scraped thereby from the teeth before they are folded.

The operation of my invention is as follows: The rake being beneath the platform and the teeth folded, and motion being imparted to the shaft L' by the forward movement of the machine, as previously described, the chains Q and Q' are started and caused to travel, carrying the rake with them, and as the rake ascends to the upper surface of the platform, at the outer or grain end thereof, the projecting end of the adjusting-bar B' comes in contact with the cam $g'$, which moves the bar longitudinally, thereby unfolding the rake-teeth and raising them to a vertical position, and projecting the opposite end of the bar in readiness for the action of the other cam, when the arm $t$ of the rake-head enters the groove $g$, which holds the rake-teeth at right angles to the plane of the platform and grain-board as the rake passes over them.

The rake-teeth, as they are moved along, gather the cut grain from the platform and move it up the grain-board to the head of the elevator, from whence it is to be discharged in a gavel upon the binders' table, or into the binding apparatus below, or upon the ground. At the moment the rake reaches the head of the elevator the crank-arm enters the part $g^2$ of the track, which is eccentric to the chain-wheels, and in traveling through it delays the radial sweep of the rake-teeth, so that the grain may not be too violently delivered. As the crank-arm leaves the eccentric portion of the track the teeth come in contact with the bar $K^2$ and are withdrawn horizontally across it, whereby they are completely cleared from any straggling grain. The rake now being upon its return movement beneath the elevator and platform, and the teeth having become disengaged from the stripper or clearer bar, the end $p$ of the adjusting-bar $B'$ is brought into contact with the cam $h'$ and rides up the same upon the track $h$, forcing the bar back to its normal position, folding the teeth against the rake-head, in which position they are held by the action of the track $h$ while the rake passes under the platform and until the opposite end of the bar, which now in its turn again projects, meets the alternate cam $g'$, at which moment the end $p$ leaves the track $h$, and the teeth are again raised to gather a fresh gavel. The rake by this construction is permitted to pass under the platform while the teeth are held positively out of contact with the ground or stubble.

I prefer to make the platform and elevator grain-board continuous, as shown, curved at their junction to allow the rake to pass freely from one to the other. This dispenses with the usual space between the platform and grain-board, and permits the rake to serve the double purpose of gathering the grain upon the platform and of conveying the same up the elevator to the point of delivery.

I do not limit myself to the use of the bars $d\ d$ and plates $e\ e$ for giving the requisite angle to the lower portion of the chains $Q\ Q'$, as I sometimes use shafts and wheels, under and against which the chains pass.

Nor do I limit myself to a forwardly-projecting crank-arm upon the rake-head, although this construction I deem preferable.

It is obvious that with a rearwardly-projecting crank-arm the eccentric portion of the track would be considerably modified, and assume a different outline in order to produce the same result, without, however, departing from the principle of my invention.

Nor is an elevated side delivery essential to the operation of my rake and the devices whereby it is controlled, as it is immaterial to its operation whether the gavels are delivered to a binding-table or directly upon the ground.

Having now fully described my invention, I claim—

1. In combination with a rake-head traveling over the surface of the platform upon its forward movement, and passing beneath on its return, a series of rake-teeth on pivots transverse to said rake-head, and mechanism whereby the teeth are laid over and held longitudinally upon the rake-head in its return movement, and brought into vertical position as it rises onto the platform for a fresh forward movement.

2. The combination, with the rake-head traveling forward in one path and returning in another, and with its pivoted teeth, of the bar $B'$, having secondary pivots for the teeth, and mechanism for intermittently reciprocating said bar to open or close the teeth, substantially as described.

3. The combination, with the rake $A'$, provided with a series of teeth, $n$, arranged to fold and unfold in the direction of the length of the head, of the adjusting-bar $B'$, carrying secondary pivots for the teeth, and projecting normally beyond said rake-head at one end, substantially as and for the purpose described.

4. The combination, with the rake $A$ and adjusting-bar $B'$, carrying secondary pivots for the teeth, and the chains $Q\ Q'$, carrying the rake, of cams or trips to operate said bar, substantially as and for the purpose specified.

5. In combination with the rake-head and its pivoted teeth, and the bar $B'$, carrying secondary pivots for the teeth, cams and trackways placed alternately, whereby the rake-teeth are folded and unfolded and held positively in position during the journey of the rake-head.

6. The combination, with a traveling rake provided with a crank-arm, of the grooved track $g$, to control the crank-arm, having the eccentrically-projecting part $g^2$ at the delivery point to deflect said crank-arm at the moment of delivering the grain, substantially as and for the purpose described.

7. In combination with a rake having teeth arranged to fold and unfold in the direction of the length of the head, the bar $K^2$, located over the driving-wheel and in the track of the rake-teeth to guide and clear them, substantially as described.

8. The combination, with the platform $J$ and grain-board $J'$, curved at their junction, as described, of the chains $Q\ Q'$, provided with links formed with an upward-projecting extension, and boxes $m$, supporting the rake and sliding on the platform and grain-board, said rake on its forward movement passing over the shoes and platform, and operated by the chains passing under the platform and shoes, substantially as and for the purpose set forth.

9. The combination, with the chains $Q\ Q'$ beneath the platform, and carrying the rake above the platform, of the shoes M, formed to confine the chains Q at the angle of the platform and afford a passage for the rake above them, substantially as and for the purpose described.

10. The combination of the rake-head A', provided with a crank-arm, t, located in advance thereof, an adjusting-bar, B', passing through said arm, and reciprocated by trips in the pathway, and the plate s, which serves as a guide to the crank-arm, substantially as described.

The above specification of my invention signed by me this 25th day of March, 1878.

ELISHA W. SKINNER.

Witnesses:
E. E. LEWIS,
D. G. TURNER.